US008636294B2

(12) United States Patent
Klieber

(10) Patent No.: US 8,636,294 B2
(45) Date of Patent: Jan. 28, 2014

(54) PASSAGE SYSTEM FOR TRANSMISSION ELEMENTS OF BICYCLE COMPONENTS

(76) Inventor: Jochen Klieber, Tacherting (DE)

( * ) Notice: Subject to any disclaimer, the term of this patent is extended or adjusted under 35 U.S.C. 154(b) by 739 days.

(21) Appl. No.: 12/846,299

(22) Filed: Jul. 29, 2010

(65) Prior Publication Data

US 2011/0025017 A1 Feb. 3, 2011

(30) Foreign Application Priority Data

Aug. 3, 2009 (DE) .......................... 10 2009 035 942

(51) Int. Cl.
*B62K 19/30* (2006.01)
*B62J 23/00* (2006.01)

(52) U.S. Cl.
USPC .................................... 280/281.1; 280/288.4

(58) Field of Classification Search
USPC .................................... 280/281.1, 274, 288.4
See application file for complete search history.

(56) References Cited

U.S. PATENT DOCUMENTS

| 724,871 | A | * | 4/1903 | Hunter | 280/283 |
|---|---|---|---|---|---|
| 4,102,219 | A | * | 7/1978 | Plamper | 74/502 |
| 4,727,953 | A | * | 3/1988 | Kudo et al. | 180/219 |
| 4,768,798 | A | * | 9/1988 | Reed et al. | 280/281.1 |
| 4,921,267 | A | * | 5/1990 | Kirk | 280/281.1 |
| 5,054,802 | A | * | 10/1991 | Smith | 280/279 |
| 5,244,224 | A | * | 9/1993 | Busby | 280/284 |
| 5,611,557 | A | * | 3/1997 | Farris et al. | 280/275 |
| RE39,159 | E | * | 7/2006 | Klassen et al. | 280/284 |
| 7,377,535 | B2 | * | 5/2008 | Chamberlain | 280/284 |
| 7,651,110 | B2 | * | 1/2010 | Davis et al. | 280/281.1 |
| 7,850,186 | B2 | * | 12/2010 | Cheng et al. | 280/281.1 |
| 7,938,425 | B2 | * | 5/2011 | Chamberlain | 280/284 |
| 8,196,948 | B2 | * | 6/2012 | Chang | 280/281.1 |
| 2003/0089144 | A1 | * | 5/2003 | Hoffman | 70/58 |
| 2004/0154852 | A1 | * | 8/2004 | Miyashiro et al. | 180/219 |
| 2005/0035573 | A1 | * | 2/2005 | Petrishe | 280/288.4 |

FOREIGN PATENT DOCUMENTS

| CN | 201062082 Y | * | 5/2008 |
|---|---|---|---|
| DE | 876957 C | | 4/1953 |
| DE | 19535508 A1 | | 9/1995 |
| DE | 29603752 U1 | | 2/1996 |
| GB | 606917 | | 8/1948 |

* cited by examiner

*Primary Examiner* — Ruth Ilan
*Assistant Examiner* — Daniel Yeagley
(74) *Attorney, Agent, or Firm* — Hiscock & Barclay, LLP

(57) ABSTRACT

The invention relates to a passage system for transmission elements for controlling bicycle components. In order to provide larger passages through a frame tube, a passage system for transmission elements of bicycle components is proposed, with a bicycle frame with a tube construction of frame tubes, a passage for transmission elements, and at least one transmission element. At least one frame tube has in its lateral surface a first opening and a second opening, which lie opposite each other. The first opening has a first edge region and the second opening has a second edge region, which are formed with a statically effective reinforcement. A passage opening of the passage for transmission elements is formed between the first and the second opening, wherein the transmission element is arranged leading through the passage opening.

14 Claims, 8 Drawing Sheets

PASSAGE SYSTEM FOR TRANSMISSION ELEMENTS OF BICYCLE COMPONENTS

RELATED REFERENCES

This application claims the benefit of the filing date of German Patent Application No. 10 2009 035 942.7 filed Aug. 3, 2009, the disclosure of which is hereby incorporated herein by reference.

FIELD OF THE INVENTION

The present invention relates to a passage system for transmission elements of bicycle components, and a bicycle with a suspended bicycle frame and a passage system.

BACKGROUND OF THE INVENTION

It is known to guide, for example, gear- or brake cables and cables for the current supply of lights along frame tubes of bicycle frames. To do this, these transmission elements, which mostly have a small circumference—a brake line has a diameter of just 5 mm—are mostly fastened at points on the underside or upper side of these frame tubes in specially constructed holders. In addition, for example, lines for the transmission of electrical energy are guided inside frame tubes. To do this, a hole with a small diameter is drilled, for example laterally, into a frame tube in the vicinity of the steering head, through which the line is threaded in. This line is then threaded out from the frame again at another location through an equally small bore hole, in order to provide with this line a direct connection between dynamo and light, for example the rear light. Bicycle frames are also known, in which likewise a gear cable enters into an upper tube laterally in the vicinity of the steering head, which cable emerges laterally again from the upper tube in the vicinity of the seat tube. These openings are relatively small openings, by which the stability of the tube construction, i.e. of the bicycle frame, is only negligibly impaired.

However, it has been found that lines having larger dimensions, e.g. transmission elements for the actuation of saddle securing devices and also hydraulic lines of brakes, are guided laterally past the frame tubes and are in part only insufficiently protected there.

SUMMARY OF THE INVENTION

A need therefore exists to provide a bicycle frame in which transmission elements having larger dimensions are also held so as to be protected in as optimum a manner as possible.

The problem is solved by the subject matter of the respective independent claims. Further embodiments are described in the respective dependent claims.

According to an exemplary embodiment of the invention, a passage system is provided for transmission elements of bicycle components, with a bicycle frame with a tube construction of frame tubes, a passage for transmission elements, and at least one transmission element for controlling a bicycle component from the group of gear cable, brake cable, hydraulic line or pneumatic line. At least one frame tube has in its covering surface or lateral area a first opening and a second opening, wherein the at least one frame tube has a tube axis and the first opening lies substantially opposite the second opening with respect to the tube axis. The first opening has a first edge region and the second opening has a second edge region, wherein a statically effective reinforcement of the first and/or of the second edge region is provided. A passage opening of the passage for transmission elements is formed between the first and the second opening, and the at least one transmission element is arranged leading through the passage opening.

By the introduction of reinforcements in the edge regions of the openings, increased applications of force can be received, which occur whilst a bicycle is being ridden. Through these reinforcements it is therefore possible to also arrange openings having larger dimensions in those zones of the tube construction which are exposed to high stresses. If openings were arranged in such stress zones without such reinforcements, the force generated by the stress could lead to a failure of the frame tube. A reinforcement is, for example, an accumulation of material, wherein this reinforcement can be embodied for example in the form of a ring, a disc or a bush. The reinforcement can be arranged both on the outer wall and also on the inner wall of the lateral area or covering surface of the frame tube or also on both walls. The reinforcement can be embodied as a separate component and can accordingly be securely connected with the frame tube, for example by welding, soldering or glueing. It is also possible to embody the reinforcement in a single piece. In particular in the case of metal materials, these reinforcements can also be produced by corresponding pressing processes. In bicycle frames which are produced from carbon fibre-reinforced plastic, the reinforcement can be laminated into the corresponding edge regions of the opening, for example, or also laminated onto these edge regions or can already be taken into consideration in the winding.

The expression "substantially" when considering the tube cross-section is understood to mean the angle between an imaginary connection of the tube axis with a mid-point of the first opening and the imaginary connection between the mid-point of the first opening and the mid-point of the second opening of approximately ±15°.

Larger objects can also be guided through such openings. For example, hydraulically operated pushers, such as are used for example for saddle height adjustment, can now be guided through such openings. To guide such a line through a frame tube, hitherto the pusher would have to be separated from the hydraulic line, in order to then evacuate the air from it again laboriously after mounting. According to the invention, transmission elements can now be guided into highly stressed zones of a frame tube or can be guided out therefrom.

According to a further exemplary embodiment of the invention, an elongated hollow body with a first end with a first end face and with a second end with a second end face is provided in the passage system. Here, the first and the second end faces have an opening respectively. The elongated hollow body connects the first opening of the frame tube and the second opening of the frame tube with each other and forms the passage for transmission elements.

The elongated hollow body thus forms, as it were, a tunnel between the first opening and the second opening, so that transmission elements, such as for example hydraulic lines for disc- or calliper brakes, gear- or brake cables, and for example current cables, can be guided without difficulty through the frame tube. The elongated body thus forms a connection between the reinforced edge regions. This elongated hollow body can also be at the same time constructed as a statically effective reinforcement, such that further reinforcements on the frame tube can be dispensed with. For example, the hollow body can be inserted into the interior formed by the frame tube, so that the first and the second end faces are respectively connected with the inner wall of the frame tube. Generally, the elongated hollow body is positioned with respect to the first opening and to the second opening in the frame tube so that constrictions or projections are avoided. Hereby, it is ensured that the transmission elements can not become caught inside the passage.

According to a further exemplary embodiment of the invention, the elongated hollow body reinforces the first and/or the second edge region in a statically effective manner.

Hereby, the elongated body can be inserted into the frame tube from the exterior through at least one of the two openings. The elongated hollow body can be applied with an end face against the inner wall of the frame tube, whilst the second end face, lying opposite the first end face, terminates flush with the outer wall of the frame tube or else projects over the latter. Of course, this end face can also stand back with respect to the outer wall such that the end of the elongated hollow body is held in the frame tube by the edge of the opening.

According to a further exemplary embodiment of the invention, the first and the second openings are arranged in zones of the at least one frame tube which are stressed by tension and pressure, wherein the elongated body is connected with the frame tube in a materially joined manner.

A materially joined connection is to be understood here to mean, for example, welding, for example with or without welding solder, hard- or soft soldering and glueing or laminating. In particular in the case of carbon fibre-reinforced bicycle frames, material joining is also understood to mean the production of such an elongated hollow body in a frame tube in a single piece and possibly without attachments. Through this material joining, in addition a reinforcement of the edge regions of the first and of the second opening can be produced. A reinforcement produced in such a way can offer an advantage in particular when the first and the second openings are arranged in zones of the bicycle frame which are particularly stressed by tension and pressure, such as for example the upper tube and/or the lower tube.

According to a further exemplary embodiment of the invention, the elongated hollow body is introduced into the first opening and/or the second opening.

According to a further exemplary embodiment of the invention, the first and/or the second end of the elongated hollow body have at least partially a lateral, outwardly-directed projection.

This projection can be formed onto the end of the elongated hollow body from the material of the hollow body, so that the hollow body is embodied in a single piece. The projection can, however, also be embodied as a separate component, which is securely connected with the elongated hollow body for example by form-fitting, force-fitting and/or material joining. The projection can be embodied as a bead, chamfer, flange, expansion, applied shoulder piece or else as a nipple. Such a nipple can be produced for example by squeezing a partial region of the outer wall of the elongated body at one end. The outwardly directed projection can fulfil two tasks here. Firstly, the projection can serve for the elongated hollow body to only be able to be introduced into the frame tube up to a certain extent through one of the two openings, which simplifies production. Secondly, the projection can also be constructed such that it can undertake the functionality of reinforcement. For example, the surface of the projection lying opposite the end face of the elongated hollow body can be adapted to the contour of the outer wall of the frame tube. Such a design can offer advantages in welding, soldering, glueing or also laminating.

It should be mentioned at this point that the inner wall of the elongated hollow body can also be composed of surfaces which are multiply curved, so that for example a trumpet shape or funnel shape is produced, which in cross-section can also have angular and/or round partial regions.

According to a further exemplary embodiment of the invention, the projection is connected in a materially joined manner with the frame tube of the bicycle frame.

Through the materially joined connection of the projection with the frame tube, the elongated hollow body is secured immovably in the frame tube. Through a corresponding design of the projection, the edge regions of the openings in the frame tube can be reinforced such that an additional introduction of further reinforcements is dispensed with.

According to a further exemplary embodiment of the invention, the elongated hollow body is constructed as a single-piece tube section.

A tube section is to be understood here to mean that the inner wall of the elongated hollow body runs parallel. If the inner wall of the tube section consists of several partial regions, then the partial region run parallel to each other. As examples of such tube sections, at this point for example tubes with a square, rectangular, oval, elliptical or else circular cross-section are to be mentioned.

According to a further exemplary embodiment of the invention, the elongated hollow body has at least a first partial piece and a second partial piece, wherein the first partial piece and the second partial piece are connected with each other.

The term of connecting the first partial piece and the second partial piece with each other is not only to be understood to mean that the first partial piece is physically connected with the second partial piece, but also that the first partial piece is connected with the second partial piece by an intermediate piece. Thus, for example, the first partial piece can be introduced through the first opening of the frame tube and the second partial piece can be introduced through the second opening of the frame tube into a central piece situated in the interior of the frame. Thus, it is possible for example to design the inner wall of the first and/or second partial piece at least partially in a funnel shape and to connect this with a tubular central piece. Of course, the first partial piece, the second partial piece and the central piece can be at least partly glued to each other.

According to a further exemplary embodiment of the invention, the first partial piece of the elongated hollow body on a first edge lying opposite the first end face, and the second partial piece of the elongated hollow body on a second edge lying opposite the second end face, have centering means matching each other respectively, such that an inner wall of the first partial piece is in alignment with an inner wall of the second partial piece.

Therefore, it is possible to introduce the first partial piece through the first opening of the frame tube and the second partial piece through the second opening, without additional adjustment measures being necessary. The centering means can be in the form of a projection on the edge lying opposite the first end face in the direction of the longitudinal extent in connection with a corresponding recess on the edge of the second partial piece lying opposite the second end face in the direction of the longitudinal extent. The centering means can also be formed for example such that the edge of the first partial piece is formed in a cone shape in the direction of the longitudinal extent and centers itself in the correspondingly formed edge of the second partial piece. Such solutions can offer the advantage that with an introduction of the two partial pieces through the two openings of the frame tubes, despite tolerances of the distances of the two openings from each other, the two partial pieces produce aligned inner walls. Aligned inner walls can facilitate the introduction of transmission elements. In order to increase the stability of the two partial pieces, these can also be glued to each other in the region of the centering means.

According to a further exemplary embodiment of the invention, the elongated hollow body is connected with the frame tube in a manner which is sealed against dirt and moisture.

It is therefore ensured that neither dirt nor moisture can penetrate into the interior of the frame tube between the outer wall of the elongated hollow body and the edges and/or edge regions of the openings. Whilst penetrated dirt undesirably increases the total weight of the bicycle, moisture which has penetrated into the frame tube can produce corrosion, which can lead to damage to the bicycle frame in the long term.

According to a further exemplary embodiment of the invention, the at least one frame tube, in which the passage for transmission elements is constructed, is an upper tube which is connected at one end with a seat tube.

According to a further exemplary embodiment of the invention, the seat tube has a seat tube central axis and the upper tube has an upper tube central axis, which together span a frame plane. The elongated hollow body has a hollow body central axis, with the hollow body central axis lying in the frame plane.

According to a further exemplary embodiment of the invention, the elongated hollow body can be arranged in an upper tube which connects a steering head with the seat tube. For example, the elongated hollow body in the upper tube can be positioned such that transmission elements, such as for example gear cables or hydraulic lines, which are guided on the upper side of the upper tube, are bent through the elongated hollow body in the direction of a bottom bracket axle along the seat tube. This makes it possible to guide the outer coverings of the brake- or gear cables in such a large curve that the friction of the inner cable on the inner wall of the outer covering is minimized. Hereby, the switching or braking performance can be improved. Hydraulic lines laid in wide curves likewise have a greater durability owing to the lower external application of force.

According to a further exemplary embodiment of the invention, the at least one frame tube is an upper tube, wherein the elongated hollow body is arranged at an angle of between 10° and 80° to the tube axis of the upper tube.

An angle of 20° to 40° is particularly suitable, especially in order to feed the hydraulic line for actuation of the height-adjustable saddle support in a large curve to this saddle support, without the hydraulic line impairing the leg movement of the cyclist or the hydraulic line colliding with other movable mechanical components.

According to a further exemplary embodiment of the invention, the bicycle frame has in addition a bottom bracket axle and the second opening is arranged closer on the bottom bracket axle than the first opening, wherein the first opening is arranged closer on the seat tube than the second opening.

By such a positioning of the elongated hollow body in the vicinity of the seat tube, it is possible for example to guide the transmission elements beneath a frame tube which connects a steering head with the seat tube and to feed the transmission elements by the passage according to the invention through the frame tube of a saddle support which is connected with the seat tube. For example, with this arrangement the hydraulic line of a pusher, which is to be actuated from the handlebar and which is mounted on a height-adjustable saddle support, can be fed in an optimized manner with regard to position, protected from mechanical impairments, such as for example abrasion, and through the elongated passage in a wide curve to this saddle support. Furthermore, the elongated hollow body is dimensioned such that the hydraulic pusher required for the actuation of the height-adjustable saddle support can be guided through the elongated hollow body without the pusher having to be detached from the hydraulic line.

According to a further exemplary embodiment of the invention, a bicycle is provided which has a suspended bicycle frame, with an upper tube, a seat tube, a bottom bracket axle and a suspended or sprung chainstay, which is held pivotably about a lower point of rotation in the region of the bottom bracket axle and which in the upper region is connected with a damped chainstay system, which is held on the upper tube and/or seat tube such that a pivoting movement of the chainstay is possible about the lower point of rotation. A passage system according to one of the preceding exemplary embodiments is provided here, the passage for transmission elements of which is arranged in the upper tube and/or in the seat tube.

According to a further exemplary embodiment of the invention, the damped chainstay system has a rocker, by which the chainstay is held on the upper tube, wherein the rocker has two deflection levers which are held respectively laterally on the upper tube so as to be pivotable about a shared axis of rotation. The passage for transmission elements of the passage system is arranged in the upper tube in the region between the deflection levers.

According to a further exemplary embodiment of the invention, the transmission element is a hydraulic line of a saddle fixation device.

Metals, such as for example aluminium, titanium and steel, and also their alloys, and plastics, in particular fibre-reinforced, come into consideration as materials for the bicycle frame.

The elongated hollow body, the two partial pieces and the central piece can be made from metal, such as for example aluminium, titanium and steel, or their alloys, and/or plastics, in particular fibre-reinforced. Furthermore, these parts can be manufactured by machining or without machining. The term "machining" is to be understood to mean, for example, milling or turning. The term "without machining" is to be understood to mean, for example, forming, master forming, injecting or casting/molding.

These and other aspects of the present invention are explained and clarified by reference to the exemplary embodiments described hereafter. It is pointed out that the individual features and aspects described above and also below with reference to the figures can of course also be combined with each other, whereby in part also advantageous effects can occur, which go beyond the sum of the individual effects.

BRIEF DESCRIPTION OF THE DRAWINGS

Exemplary embodiments are described below with reference to the following drawings, in which are shown.

DETAILED DESCRIPTION OF EXEMPLARY EMBODIMENTS

First of all, it is to be mentioned that identical parts in the figures have identical reference numbers and that the drawings are only diagrammatic and are not necessarily true to scale.

Figure 1:
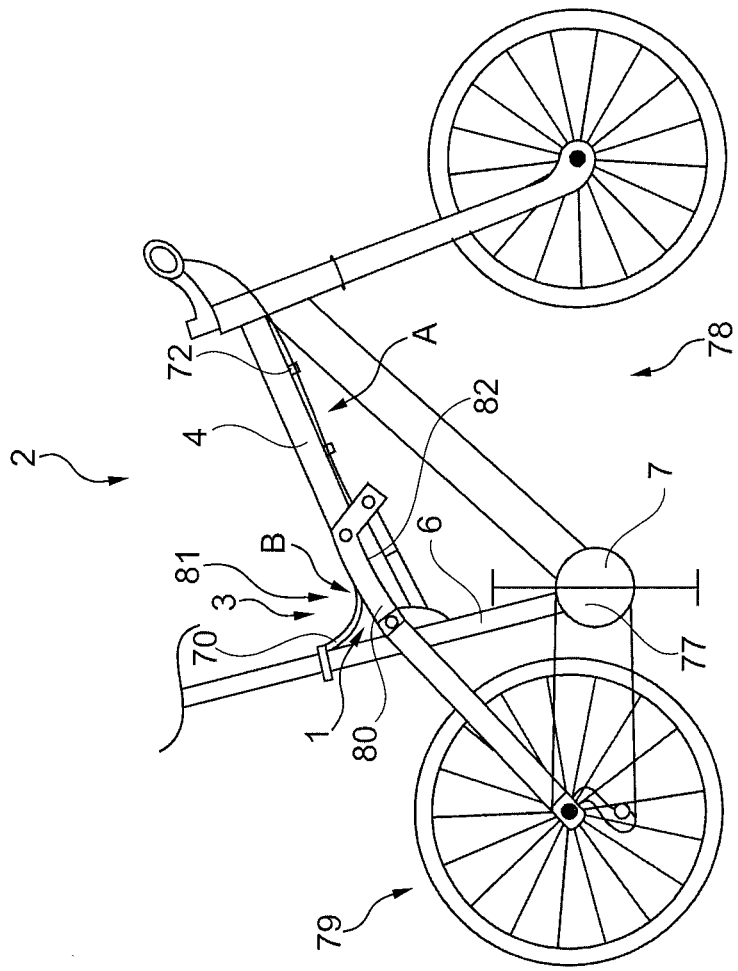
FIG. 1 a bicycle with a passage system according to the invention for transmission elements of bicycle components.

FIG. 1 shows a bicycle 78 with a suspended bicycle frame 2, which has an upper tube 4, a seat tube 6, a bottom bracket axle 7 and a suspended chainstay 79, which is held pivotably about a lower point of rotation 77 in the region of the bottom bracket axle and which in the upper region is connected with a damped rocker 80 of a chainstay system 81. The rocker is held on the upper tube such that a pivoting movement of the chainstay about the lower point of rotation is possible. The rocker has two deflection levers 82, which are held respectively laterally on the upper tube so as to be pivotable about a shared axis of rotation, wherein in FIG. 1 only one lateral deflection lever is to be seen; the other of which is concealed. In addition, a passage system 1 for transmission elements of bicycle components is provided, which comprises the bicycle frame 2 with a tube construction of frame tubes, a passage 3 for transmission elements, and at least one transmission element for controlling a bicycle component of the group of gear cable, brake cable, hydraulic line or pneumatic line. The passage for transmission elements can be arranged for example in the upper tube in the region between the deflection levers 82.

As shown by way of example in FIG. 1, a hydraulic line 70 is guided, as transmission element, from the handlebar to a saddle support, which has, for example, a hydraulically actuatable adjustment mechanism. The hydraulic line 70 is guided through between the rocker 80. The passage of the hydraulic line through an elongated hollow body 24, arranged for example in the upper tube 4, is concealed in FIG. 1 by the rocker (see below).

In order to guide the transmission element, e.g. the hydraulic line 70, in as protected a manner as possible, it runs in a first region A below the upper tube. In a second region B, the transmission element runs above the upper tube, in order to be connected with the bicycle component, in the example in FIG. 2 an adjustable saddle support arresting arrangement (not illustrated in further detail).

The terms "above" and "below" refer to the normal upright arrangement of the frame, which is also present during travelling.

Figure 2:
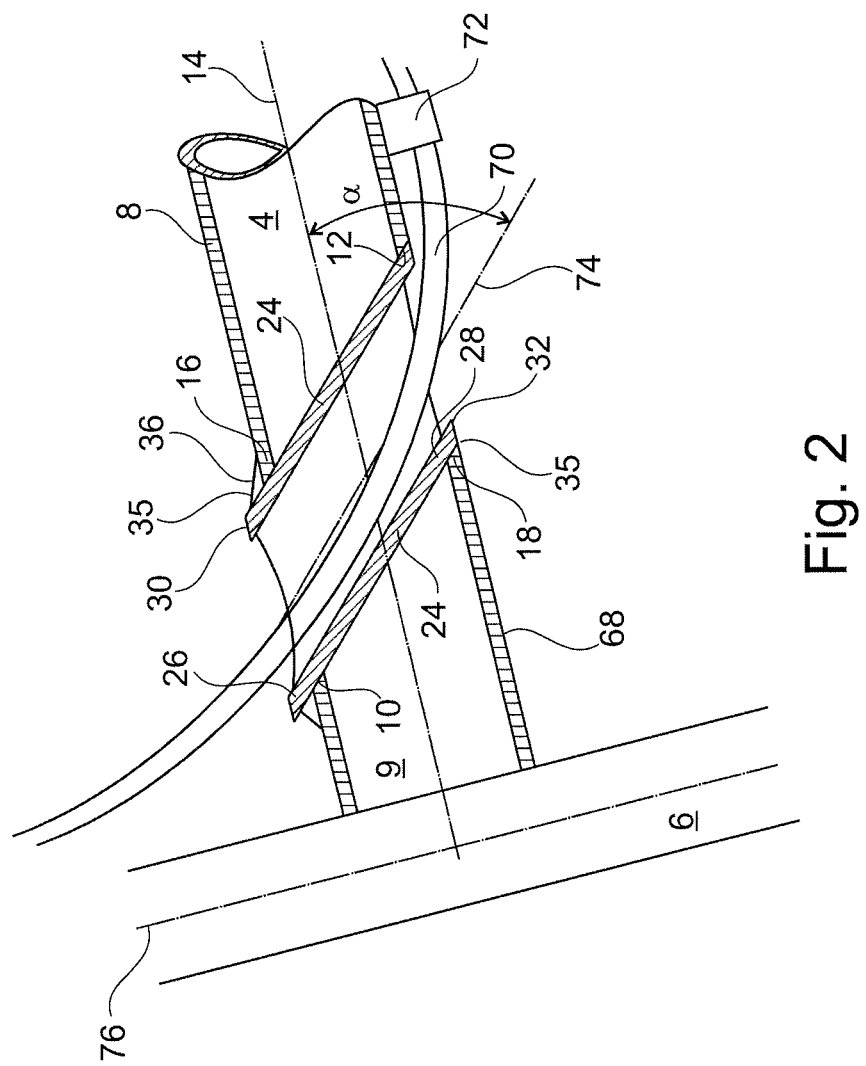
FIG. 2 an embodiment of a passage system according to the invention with a passage for transmission elements.

In order to arrive from one side of the upper tube to the other, the passage for transmission elements has a passage opening, through which the at least one transmission element is arranged, leading through (not shown; see FIG. 2 ff.).

The passage system 1 is explained below with the aid of various exemplary embodiments.

In FIG. 2 the bicycle frame 2 of the passage system 1 is shown in a cut-out. The chainstay system shown in FIG. 1, in particular the two-part rocker and its fastening on the upper tube are not illustrated in the following figures, for the sake of clarity.

The bicycle frame 2 consists of a tube construction of frame tubes. The upper tube 4 is illustrated here, which is securely connected with a seat tube 6. The upper tube 4 is formed substantially by a covering surface 8. The frame tube has in its covering surface 8 a first opening 10 and a second opening 12; wherein the at least one frame tube has a tube axis 14 and the first opening 10 lies substantially opposite the second opening 12 with respect to the tube axis 14. The first opening 10 has a first edge region 16 and the second opening 12 has a second edge region 18; wherein a statically effective reinforcement of the first 16 and/or second edge region 18 is provided.

The passage opening of the passage for transmission elements is formed between the first and the second opening. The hydraulic line 70, as an example of a transmission element, is arranged leading through the passage opening.

In FIG. 2, an elongated hollow body 24 connects the first opening 10 and the second opening 12 with each other. The elongated hollow body has at a first end 26 a first end face 30 and at a second end 28 a second end face 32. In addition, both the first 30 and also the second 32 end face have respectively one opening 34. The elongated hollow body 24 connects the first opening 10 and the second opening 12 with each other and forms the passage for transmission elements.

In the exemplary embodiment illustrated in FIG. 2, the second end face 32 of the elongated hollow body 24 terminates flush with an underside 68 of the frame tube. The elongated hollow body is welded in the region of the second end face 32 and with the first end 26 with the covering surface 8 in the two edge regions 16, 18 with the frame tube. For this, the weld seam 35 is placed circumferentially. In addition, the hydraulic line 70 can be seen, which runs on the underside 68 of the upper tube 4 and is fixed there by a fastening means 72. In addition, the hydraulic line 70 runs in a large curve through the elongated hollow body 24 to the seat tube 6. The hollow body has a hollow body central axis 74, which extends along the elongated hollow body 24. The tube axis 14 and the hollow body central axis 74 form an angle $\alpha$ of 10° to 80°. The angle $\alpha$ is selected here so that the large laying curve of the hydraulic line 70 is not impeded. In the exemplary embodiment present here, the angle $\alpha$ is approximately 20° to 40°. In addition, it can be seen in this exemplary embodiment that the first opening 10 is arranged closer on the seat tube 6 than the opening 12. In addition, the seat tube 6 has a seat tube central axis 76, which spans a plane together with the hollow body central axis 74, so that hereby the position of the elongated hollow body 24 to the seat tube 6 is determined.

Figure 3:
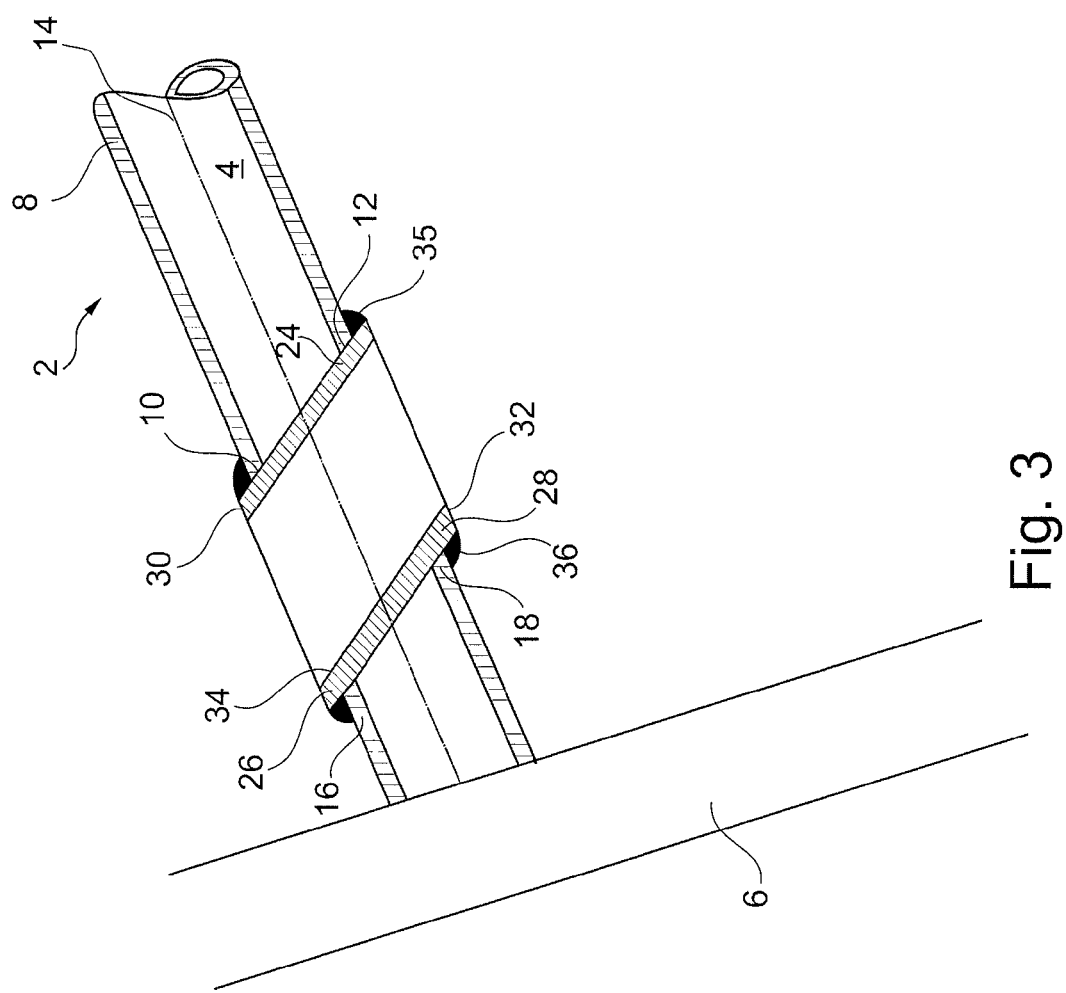
FIG. 3 a further embodiment of a passage for transmission elements according to the invention.

FIG. 3 shows a cut-out of the bicycle frame 2 with a further embodiment of the elongated hollow body 24. In the exemplary embodiment shown here, the longitudinal extent of the elongated hollow body 24 is greater than the height of the upper tube 4, so that at least a portion of the two ends 26, 28 of the elongated hollow body 24 project over the covering surface 8. Of course, it would also be possible to only allow one of the ends 26, 28 to project over the covering surface 8 (see also FIG. 1 in this respect). The elongated hollow body 24 is positioned in the two openings 10, 12 such that it projects with its two ends 26, 28 uniformly over the covering surface 8. In addition, the two ends 26, 28 are welded with the covering surface 8. The weld seam 35, in connection with the first edge region 16 of the first opening 10 and the second edge region 18 of the second opening 12 forms a third embodiment of a reinforcement 36. Further, the elongated hollow body 24 is constructed in this example as a tube section. Through the weld seam 35, circumferentially connecting the two ends 26, 28 with the two edge regions 16, 18, the elongated hollow body 24 is not only connected with the frame tube so as to be sealed against dust and moisture, but is also constructed in a stable manner such that the tension- and pressure stresses occurring during operation in the two edge regions 16, 18 can be received by the elongated hollow body.

It is pointed out that the transmission element of the passage system according to the invention is not shown in FIG. 3, as well as in the following figures.

Figure 4:
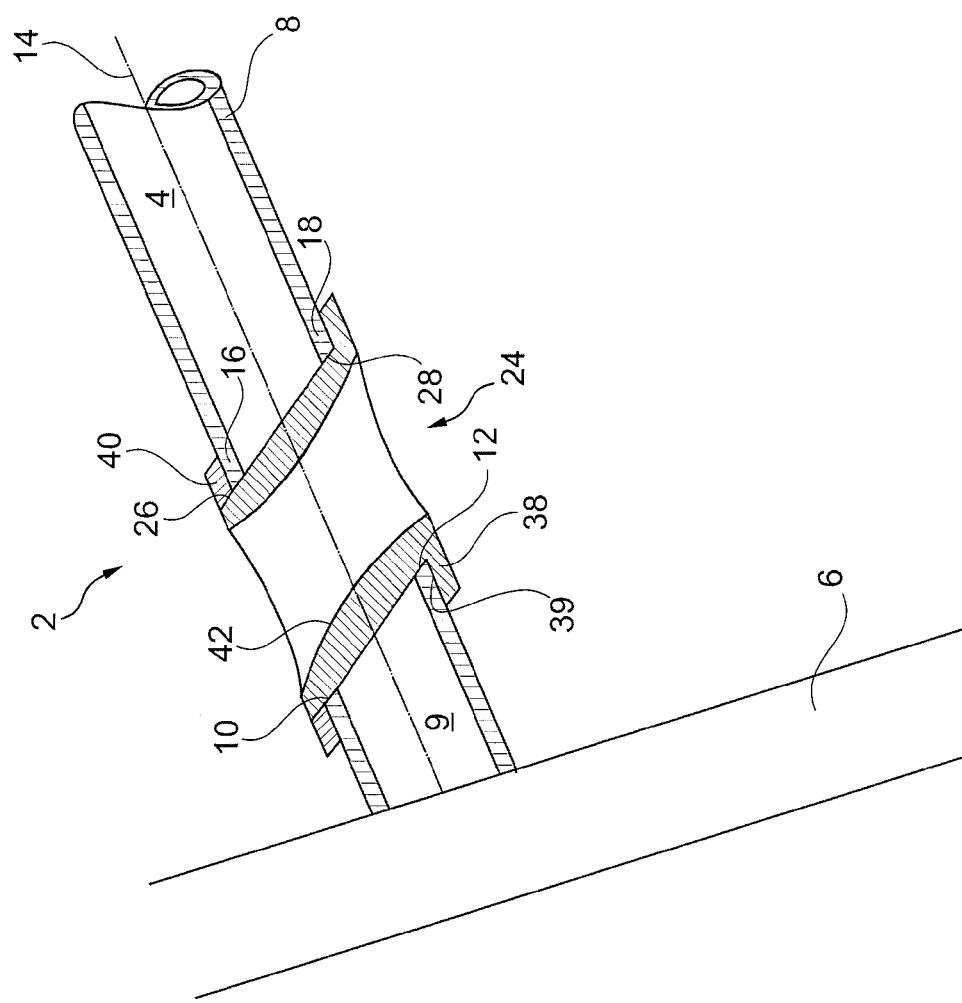
FIG. 4 a further embodiment of a passage for transmission elements according to the invention.

FIG. 4 shows a cut-out from a bicycle frame 2 with a further embodiment of the elongated hollow body 24. In the exemplary embodiment shown here, a projection 38, directed laterally outwards, is formed at the second end 28 of the elongated hollow body 24. This projection 38 serves firstly as a stop on insertion of the elongated hollow body 24 into the upper tube 4 and on the other hand as a further embodiment of a reinforcement of the second edge region 18. The surface 39 of the first projection 38, facing the covering surface 8, is adapted to the outer contour of the covering surface 8 in the second edge region 18. Therewith, no unnecessary gaps occur between the covering surface and the first projection 38, into which moisture or dirt could enter. In addition, such accurately fitting surfaces can be better connected with each other in a materially joined manner. After the insertion of the elongated hollow body 24 through the two openings 10, 12, the first end 26 is secured through a second projection 40. Therewith, the elongated hollow body 24 can no longer slip out from the upper tube 4. The second projection 40 is constructed as a curved disc, which is connected in a materially joined manner with the first end 26 of the elongated hollow body 24 and with the first edge region 16 of the covering surface 8. In addition, the inner wall 42 of the elongated hollow body 24 is constructed in a trumpet shape in the example present here.

Figure 5:
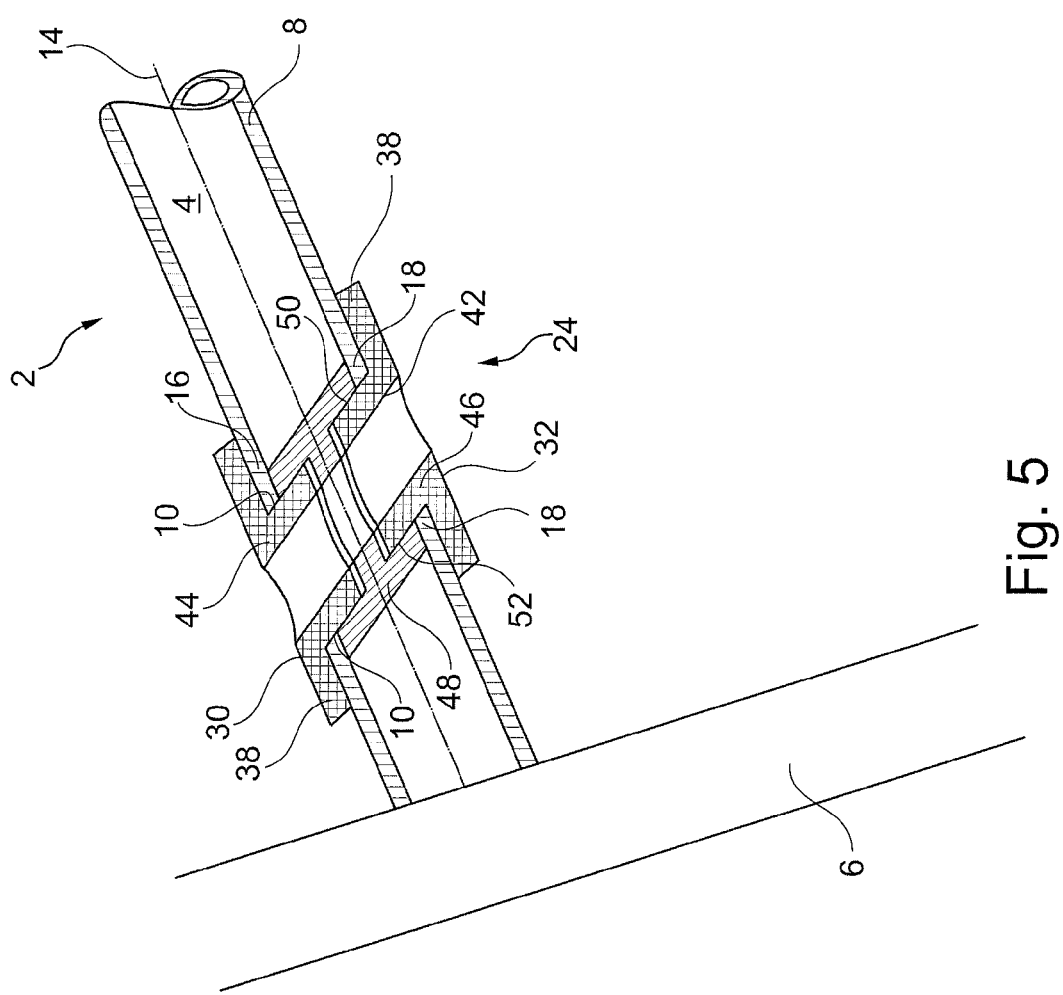
FIG. 5 a further embodiment of a passage for transmission elements according to the invention.

FIG. 5 shows a cut-out from a bicycle frame 2 with a further embodiment of the elongated hollow body 24, which is formed by a first partial piece 44, a second partial piece 46 and a central piece 48. Here, the first partial piece 44, the second partial piece 46 and the central piece 48 are connected with each other. In both partial pieces 44, 46, the projection 38 is formed at the end 26, 28 of the respective partial piece 44, 46. The first partial piece 44 is introduced through the first opening 10 and the second partial piece 46 through the second opening 12 so far into the upper tube 4 until the two projections 38 prevent a further insertion. In this position, the central piece 48 connects the two partial pieces 44 and 46 such that an inner wall 50 of the central piece 48 at least partially encompasses the respective outer wall 52 of the two partial pieces 44, 46. Of course, the central piece 48 can be connected in a materially joined manner with the two partial pieces 44, 46. The central piece is shaped such that it produces an inner wall 42 of the two partial pieces 44, 46 in alignment with each other.

Figure 6:
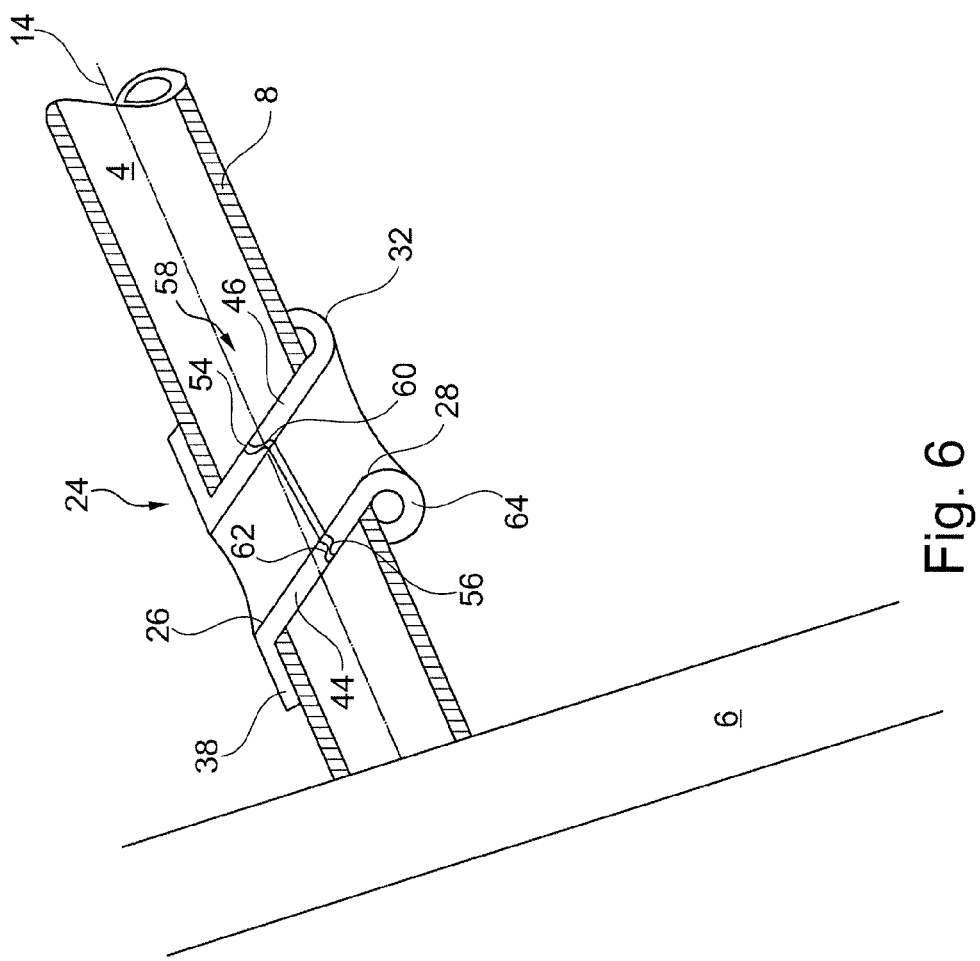
FIG. 6 a further embodiment of a passage for transmission elements according to the invention.

FIG. 6 shows a cut-out from a bicycle frame 2 with a further embodiment of the elongated hollow body 24. Here, the elongated hollow body consists of a first partial piece 44 and a second partial piece 46. The first partial piece 44 has a first edge 54 lying opposite the first end face 30. The second partial piece 46 has a second edge 56 lying opposite the second end face 32. At the first end 26 of the first partial piece 44, a projection 38 is formed, which is similar to a bent disc. The second partial piece 46 has at its second end 28 a projection 64, which in this exemplary embodiment is similar to a flange. A projection 64 designed in such a way offers the advantage that no projecting edges or burrs are present at the opening 34 of the second end face 32 of the second partial piece 46 through the trumpet-shaped forming. Objects which are introduced into the second partial piece 46 are therefore guided in a funnel shape to the inner wall 42. The first partial piece 44 is aligned with the second partial piece 46 by centering means 58 to each other such that the inner walls 42 of the two partial pieces 44, 46 are in alignment with each other. In the present exemplary embodiment, a projection 62 is arranged for this on the first edge 54, said projection engaging in a recess 60 arranged on the second edge 56 of the second partial piece 46. In addition to the materially joined connection of the two projections 38, 64 with the covering surface 8, the centering means 58 can also be connected with each other in a materially joined manner.

The elongated hollow body 24 and the partial pieces 44, 46 forming it, and the central piece 48, can be produced from metal and its alloys, and plastics, which can also be fibre-reinforced. The parts can be produced mechanically, cast or injected. In addition, the bicycle frame 2 can be produced from metal, such as for example titanium, aluminium or steel, and its alloys, or from fibre-reinforced, in particular carbon fibre-reinforced plastic.

Figure 7:
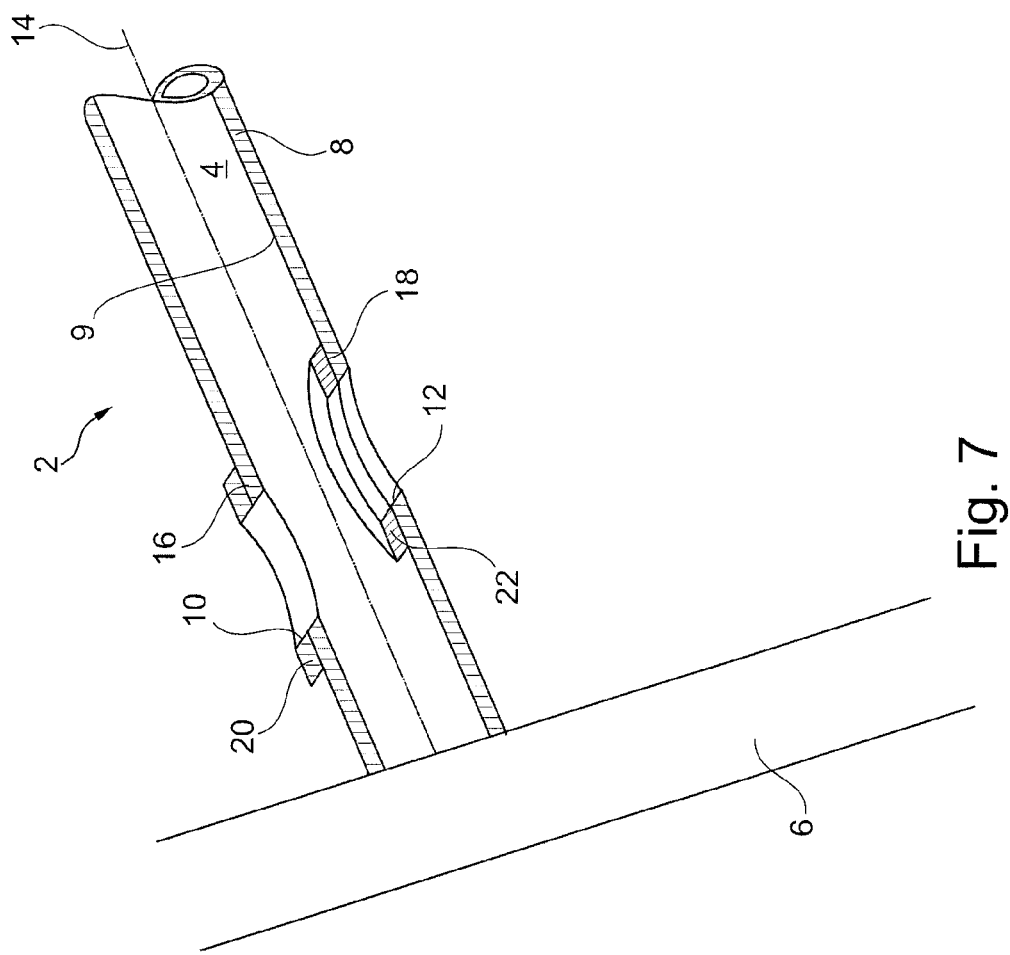
FIG. 7 a further embodiment of a passage for transmission elements according to the invention.

In the exemplary embodiment present in FIG. 7, the reinforcement 20 is embodied in one piece with the covering surface 8 of the upper tube 4. This reinforcement 20 is an accumulation of material which projects over the covering surface 8. The second edge region 18, surrounding the second opening 12, is reinforced in a statically effective manner by a second embodiment of the reinforcement 22. In the case present here, the second embodiment of the reinforcement 22 is embodied as a curved disc which is glued over the entire surface with an inner wall 9 of the covering surface 8. In the example present here, the length of the first opening 10, measured along the tube axis 14, is approximately 15 mm. The width of the first opening 10, measured transversely to the tube axis 14, is approximately 10 mm. The transmission element, which is not illustrated, runs through the two openings from bottom right obliquely to top left.

Figure 8:
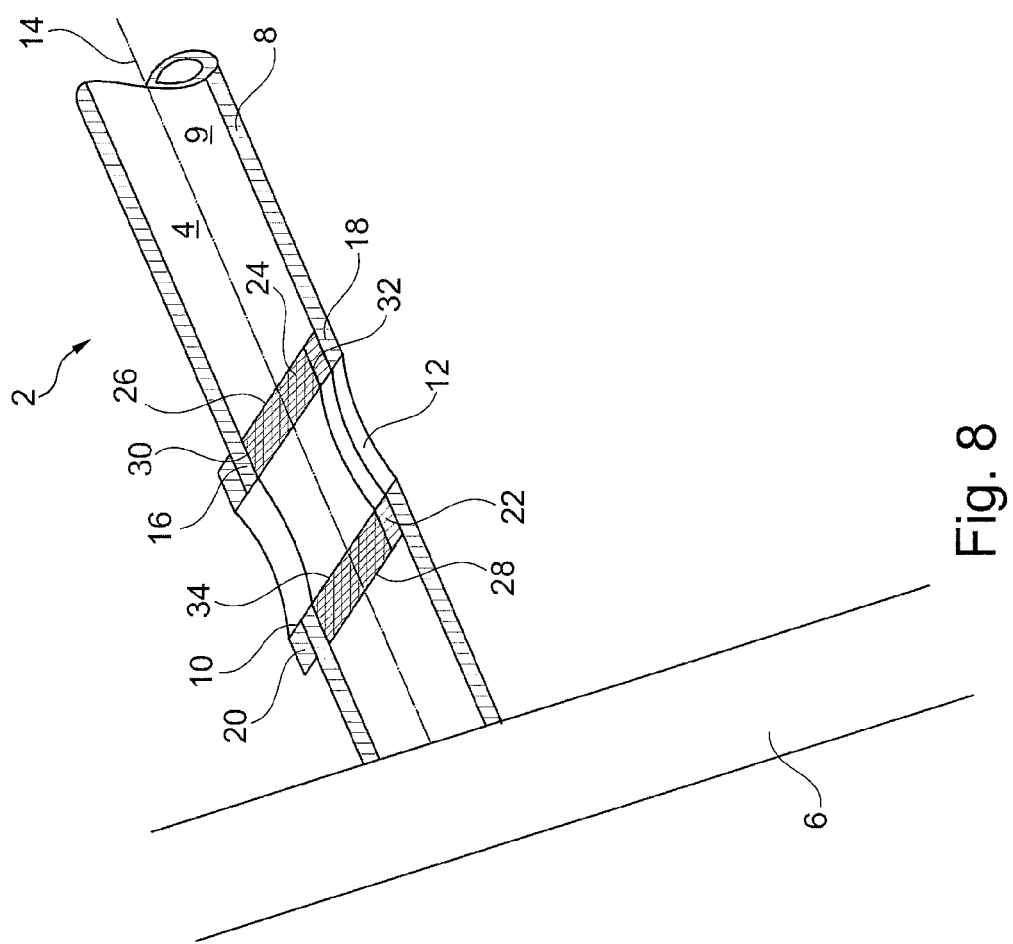
FIG. 8 a further embodiment of a passage for transmission elements according to the invention

FIG. 8 shows the cut-out from the bicycle frame 2, already described in FIG. 7, in which the elongated hollow body 24 connects the first opening 10 and the second opening 12 with each other. In the example present here, the cross-section of the opening 34 is congruent with the cross-section of the first opening 10 and with the cross-section of the second opening 12. Further, it can be seen from FIG. 8 that the elongated hollow body 24 adjoins the inner wall 9 of the covering surface 8 with the first end face 30 in the first edge region 16 of the first opening 10. Further, the second end face 32 of the elongated hollow body 24 adjoins the reinforcement 22. In order that the elongated hollow body 24 can not move along the tube axis 14 inside the upper tube 4, the two end faces 30, 32 are connected in a materially joined manner with the inner wall 9 of the covering surface 8 or respectively the reinforcement 22, being glued in the example present here.

Through the reinforcements 20, 22, 36, 38, the two edge regions 16, 18 of the openings 10, 12 can be reinforced in frame tubes, which are stressed by tension and pressure, such that such openings 10, 12 can be arranged independently of their size in such zones of a frame tube which are stressed by tension and pressure. Further, the openings 10, 12 can be connected with each other by the elongated hollow body 24 such that a tunnel is formed between these openings 10, 12, through which transmission elements, such as for example gear- and brake cables, hydraulic or pneumatic lines and electric cables can be passed through the frame tube. Through the position of the elongated hollow body, the transmission elements can be placed in a wide curve, so that they are not additionally stressed by additional forces which are caused by tight curves. In addition, it is possible to connect the ends 26, 28 of the elongated hollow body 24 with the frame tube in a materially joined manner for example by the projections 38, 40 or the weld seam 35, such that the stresses occurring in the edge regions 16, 18 are introduced into the elongated hollow body, without damaging the bicycle frame.

LIST OF REFERENCE NUMBERS 1 passage system
2 bicycle frame 4 upper tube
6 seat tube
7 bottom bracket axle
8 lateral area or covering surface
9 inner wall of the covering surface
10 first opening
12 second opening
14 tube axis
16 first edge region
18 second edge region
20 first embodiment of the reinforcement
22 second embodiment of the reinforcement
24 elongated hollow body
26 first end of the elongated hollow body
28 second end of the elongated hollow body
30 first end face of the elongated hollow body
32 second end face of the elongated hollow body
34 opening in the end face
35 weld seam
36 third embodiment of the reinforcement
38 fourth embodiment of the reinforcement
39 surface of the reinforcement
40 fifth embodiment of the reinforcement
42 inner wall of the elongated hollow body
44 first partial piece
46 second partial piece
48 central piece
50 inner wall
52 outer wall
54 first edge
56 second edge
58 centering means
60 recess
62 projection
64 sixth embodiment of the reinforcement
68 underside
70 hydraulic line
72 fastening means
74 hollow body central axis
76 seat tube central axis
78 bicycle
79 chainstay
80 rocker
81 chainstay system
82 deflection lever
A region below the upper tube
B region above the upper tube
α angle

The invention claimed is:

1. Passage system for transmission elements of bicycle components comprising:
 a bicycle frame with a tube construction of frame tubes comprising an upper tube;
 a passage for transmission elements; and
 at least one transmission element for control of a bicycle component of the group of gear cable, brake cable, hydraulic line or pneumatic line;
 wherein the upper tube is formed substantially by a covering surface;
 wherein the upper tube has in the covering surface a first opening and a second opening; wherein the upper tube has a tube axis and the first opening lies substantially opposite the second opening with respect to the tube axis; and wherein the first opening has a first edge region and the second opening has a second edge region;
 wherein a statically effective reinforcement of the first and/or second edge region is provided;
 wherein a passage opening of the passage for transmission elements is formed between the first and the second opening;
 wherein the at least one transmission element is arranged leading through the passage opening;
 wherein the bicycle frame has a bottom bracket axle; and
 wherein the second opening is arranged closer to the bottom bracket axle than the first opening; and the first opening in is arranged closer to a seat tube than the second opening.

2. Passage system according to claim 1, in which an elongated hollow body is provided with a first end with a first end face and with a second end with a second end face;
 wherein the first and the second end face respectively have an opening; and
 wherein the elongated hollow body connects the first opening and the second opening with each other and forms the passage for transmission elements.

3. Passage system according to claim 2, in which the elongated hollow body reinforces the first and/or the second edge region in a statically effective manner.

4. Passage system according to claim 2, in which the first and the second opening are arranged in zones of the upper tube which are stressed by tension and pressure; and
 in which the elongated hollow body is connected in a materially joined manner with the upper tube.

5. Passage system according to claim 2, in which the elongated hollow body is introduced into the first opening and/or the second opening.

6. Passage system according to claim 2, wherein the first and/or the second end of the elongated body have at least partially a lateral, outwardly directed projection.

7. Passage system according to claim 1, in which the elongated hollow body has at least a first partial piece and a second partial piece;
 wherein the first partial piece and the second partial piece are connected with each other.

8. Passage system according to claim 7, wherein the first partial piece on a first edge lying opposite the first end face and the second partial piece on a second edge lying opposite the second end face have centering means matching each other respectively, such that an inner wall of the first partial piece is in alignment with an inner wall of the second partial piece.

9. Passage system according to claim 1, in which the upper tube is connected at one end with the seat tube.

10. Passage system according to claim 9, in which the seat tube has a seat tube central axis and the upper tube has an upper tube central axis, which together span a frame plane;
 wherein the elongated hollow body has a hollow body central axis; and
 wherein the hollow body central axis lies in the frame plane.

11. Passage system according to claim 9, in which the elongated hollow body is arranged at an angle α of between 10° and 80° to the tube axis of the upper tube.

12. Bicycle with a suspended bicycle frame, which has an upper tube, a seat tube, a bottom bracket axle and a suspended chainstay, which is held pivotably about a lower point of rotation in the region of the bottom bracket axle, and which is connected in the upper region with a damped chainstay system, which is held on the upper tube and/or on the seat tube such that a pivoting movement of the chainstay is possible about the lower point of rotation; and
 a passage system including a passage for transmission elements arranged in the upper tube according to claim 1.

13. Bicycle according to claim 12, in which the damped chainstay system has a damped rocker with two deflection levers, which are held respectively laterally on the upper tube so as to be pivotable about a shared axis of rotation, and by which the chainstay is held on the upper tube;
   wherein the passage for transmission elements is arranged in the region between the deflection levers.

14. Bicycle according to claim 12, wherein the transmission element is a hydraulic line.

\* \* \* \* \*